Jan. 11, 1927.
W. H. TSCHAPPAT
1,614,266
EXPANSIBLE SPROCKET WHEEL
Filed Oct. 20, 1925
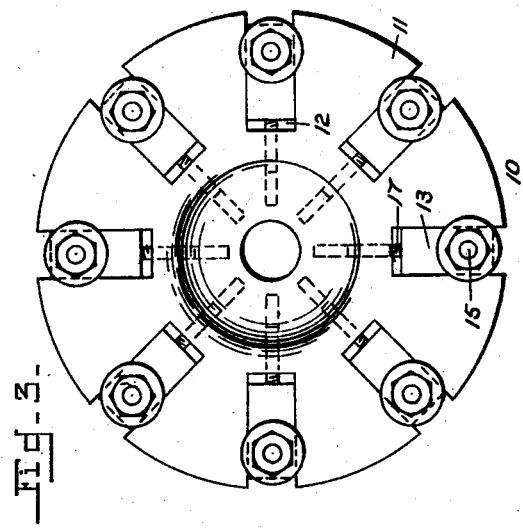
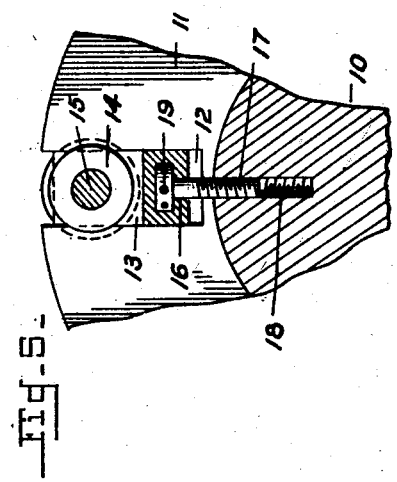
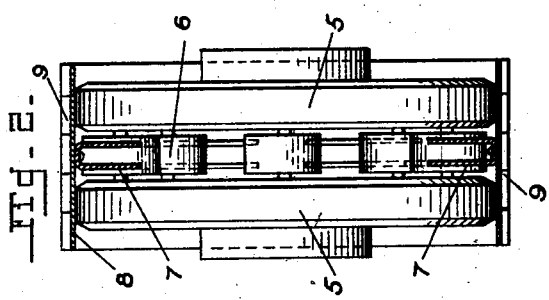
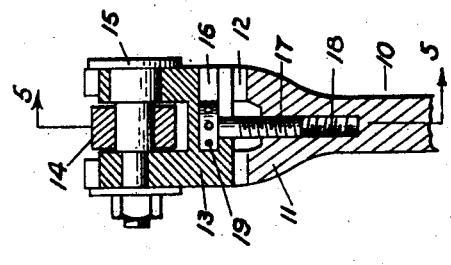
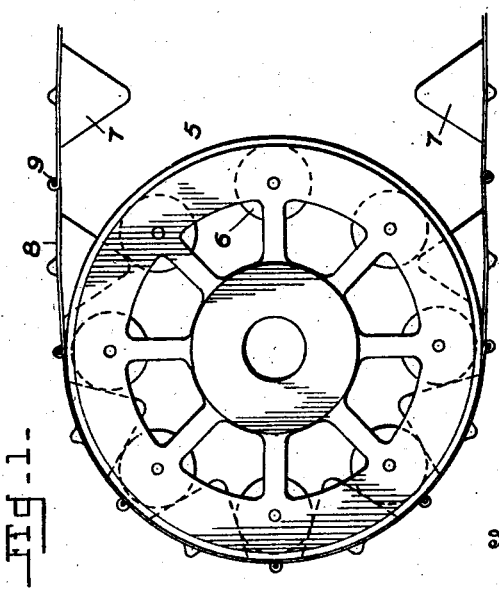
Inventor
W. H. Tschappat
By W. N. Roach
Attorney Patented Jan. 11, 1927.

1,614,266

UNITED STATES PATENT OFFICE.

WILLIAM H. TSCHAPPAT, OF WASHINGTON, DISTRICT OF COLUMBIA.

EXPANSIBLE-SPROCKET WHEEL.

Application filed October 20, 1925. Serial No. 63,793.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

This invention relates to an expansible sprocket wheel.

It is well known that a chain cannot be in true pitch with its sprocket except when new because of its lengthening or stretching due to wear of the parts. This condition results in slippage and involves the consequences of waste of power, unequal distribution of the load, and excessive and undue noise.

With a view to obviating these difficulties, expansible sprockets have been used and the present invention contemplates a novel sprocket of this character in which the individual drive rollers are adjustable radially to effect a variable pitch for accommodating the changing pitch of the driving lugs of the chain or track.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a view in side elevation of a sprocket wheel and chain showing the true pitch which is to be maintained between these members;

Fig. 2 is an end view thereof with the track in section;

Fig. 3 is a view in side elevation of a sprocket wheel provided with radially adjustable drive rollers;

Fig. 4 is an enlarged fragmentary transverse sectional view of the sprocket wheel; and Fig. 5 is a sectional view on the line 5—5 of Fig. 4.

Referring to the drawings by numerals of reference:

In the sprocket wheel shown in Figures 1 and 2, the spaced rims 5 mount drive rollers 6 which engage the drive lugs 7 of a chain or track 8. As long as the pitch of the track as determined by the spacing between the lugs 7 remains fixed in relation to the corresponding pitch of the rollers 6 very little wear will occur on the lug 7 and the maximum drive power and equal distribution of the load will be maintained. However, due to wear of the track joints 9 the track becomes elongated thereby increasing the pitch of the track lugs with reference to the pitch of the sprocket, after which very rapid wear on the lugs 7 will take place.

Accordingly as shown in Figures 3 to 5 provision is made for adjusting the rollers 6 radially to effect a variable pitch for accommodating the changing pitch of the track driving lugs 7. One method of accomplishing this purpose is herein shown and consists in providing a sprocket wheel 10 having either a divided or a peripherally grooved rim 11 formed with spaced transverse recesses 12.

Positioned within each of the recesses 12 is a bearing block 13 in the form of a yoke between the arms of which is a drive roller 14 mounted on a pin 15. The under side of the block is formed with a T-slot 16 for receiving the headed end of a screw bolt 17 whereby the block is adjustably secured to the spoke or body 18 of the sprocket wheel. The head of the bolt is provided with peripheral apertures 19 to receive a tool for turning the bolt.

As the track stretches and its driving lugs become worn the bearing blocks carrying the drive rollers may be correspondingly adjusted.

While in the foregoing there has been illustrated and described such combination and arrangement of elements, as constitute the preferred embodiment of the invention, it is nevertheless desired to emphasize the fact that interpretation of the invention should only be conclusive when made in the light of the subjoined claims.

I claim:

1. A sprocket wheel having a divided rim and formed with transverse recesses, yoked bearing blocks disposed in the recesses, said blocks provided with a T-slot on their under sides, a screw bolt threadable in the wheel and having an apertured head receivable in the T-slot, a pin journaled in the arms of the bearing blocks, and a driving roller mounted on the pin.

2. A sprocket wheel having a divided rim and formed with transverse recesses, yoked bearing blocks disposed in the recesses, a drive roller mounted in each bearing block, and means carried by the block and rotatable with respect thereto for adjustably securing the block to the wheel.

WILLIAM H. TSCHAPPAT.